United States Patent

Itaya

Patent Number: 5,285,669
Date of Patent: Feb. 15, 1994

[54] SPRING MANUFACTURING APPARATUS AND SPRING CUTTING MECHANISM

[75] Inventor: Ichiro Itaya, Katsushika, Japan

[73] Assignee: Kabushiki Kaisha Itaya Seisaku Sho, Japan

[21] Appl. No.: 82,271

[22] Filed: Jun. 24, 1993

[30] Foreign Application Priority Data

Jan. 27, 1993 [JP] Japan .................. 5-011948

[51] Int. Cl.$^5$ .................. B21F 11/00; B23K 26/14
[52] U.S. Cl. .................. 72/132; 72/135; 72/324; 140/140; 219/121.67; 219/121.72
[58] Field of Search .......... 219/121.67, 121.72; 72/132, 131, 129, 135, 145, 324, 338; 140/139, 140

[56] References Cited

U.S. PATENT DOCUMENTS

| | | | |
|---|---|---|---|
| 3,906,766 | 9/1975 | Sato | 72/132 |
| 4,610,281 | 9/1986 | Fuchs et al. | 140/140 |
| 4,779,438 | 10/1988 | Frei | 72/132 |
| 4,873,854 | 10/1989 | Russel et al. | 72/132 |

FOREIGN PATENT DOCUMENTS

| | | | |
|---|---|---|---|
| 3334380 | 4/1985 | Fed. Rep. of Germany | 140/139 |
| 0054485 | 3/1984 | Japan | 219/121.67 |

OTHER PUBLICATIONS

Nivens, "Laser Beam Wire Stripping Machine", Oct. 1979, Western Electric Technical Disclosure.

*Primary Examiner*—Lowell A. Larson
*Assistant Examiner*—Michael J. McKeon
*Attorney, Agent, or Firm*—Merchant, Gould, Smith, Edell, Welter & Schmidt

[57] ABSTRACT

A spring manufacturing apparatus for reducing the time from the beginning to the completion of the manufacturing of a spring having a flat end surface and for manufacturing a large amount of springs at a high-speed. Feed rollers 3a and 3b supply wire material 1 to point tools 4a and 4b. When a single spring is formed, laser output portion 7 is moved in an X direction by the spring pitch length and laser irradiation to the wire material 1 is started. At the same time, feed rollers 3a and 3b feed the wire material for one coil of spring to be manufactured.

4 Claims, 6 Drawing Sheets

SPRING MANUFACTURING APPARATUS AND SPRING CUTTING MECHANISM

BACKGROUND OF THE INVENTION

The present invention relates to a spring. manufacturing apparatus and, more particularly, to a spring manufacturing apparatus for manufacturing a spring which compresses or expands in the axial direction thereof.

In a spring manufacturing apparatus, when manufacturing of a single spring is completed, the wire material is cut at the end portion of the manufactured spring.

Generally, to cut the wire material, a cutter tool is forced in the wire material at the end portion of the spring. The cutting operation is repeated every time one spring is formed.

This spring manufacturing has a problem in a case where the wire material is comparatively thick with respect to the diameter of the spring.

When the wire material is comparatively thin with respect to the diameter of the spring, the end surface (the circular cross section of the spring horizontal to the axial direction) is approximately flat. However, if the wire material is thick, the end surface of the spring is not level as shown in FIG. 7 (70). In this case, if the spring end surface is required to be flat, the wire material of the end surface is ground as shown in FIG. 7 (71). In this manner, the conventional spring manufacturing includes a spring forming process and an end surface grinding process which should be performed independently.

The end surface grinding process may be performed on both ends of a spring, further, processing time is not negligible.

SUMMARY OF THE INVENTION

The present invention has been made in consideration of the above situation, and has as its object to provide a spring manufacturing apparatus which reduces the time from the beginning to the completion of a spring having a flattened end and which manufactures a large number of springs at high-speed.

According to the present invention, the foregoing object is attained by providing a spring manufacturing apparatus which forms a spring by supplying a wire material toward a point tool provided around a spring forming section and bringing the wire material into contact with the point tool so as to forcibly bend the wire material to make a diameter of the spring, comprising: a feed roller for feeding the wire material toward the point tool; a first motor for rotating the feed roller; laser generation means for generating a laser beam for cutting the wire material; laser irradiation means, movable in a direction substantially parallel to a developing direction of the spring made of the wire material bent by being brought into contact with the point tool, for irradiating the laser generated by the laser generation means upon the bent wire material; a second motor for moving the laser irradiation means; and control means for, when manufacturing of a single spring is completed, activating the laser generation means and driving the first and second motors at a synchronous timing.

Further, according to the present invention, the foregoing object is attained by providing a spring manufacturing apparatus which forms a spring by supplying a wire material toward a point tool located around a spring forming section and bringing the wire material into contact with the point tool so as to forcibly bend the wire material to make a diameter of the spring, comprising: wire material supply means for supplying the wire material toward the point tool; laser generation means for generating a laser beam for cutting the wire material; laser irradiation means, movable in a direction substantially parallel to a developing direction of the spring made of the wire material bent by being brought into contact with the point tool, for irradiating the laser generated by the laser generation means upon the bent wire material; and control means for, when manufacturing of a single spring is completed, activating the laser generation means and starting to move the laser irradiation means in the developing direction of the spring by one pitch.

Another object of the present invention is to provide a spring cutting mechanism appropriate for smoothing the end portion of springs continuously manufactured and manufacturing a large amount of springs at a high-speed.

According to the present invention, the foregoing object is attained by providing a spring cutting mechanism in a spring manufacturing apparatus comprising: laser generation means for generating a laser beam for cutting a wire material; irradiation means, movable in a direction substantially parallel to a developing direction of a spring, for irradiating the laser beam generated by the laser generation means upon the wire material being formed into a spring; and control means for, when manufacturing of a single spring is completed and a next spring is to be manufactured, activating the laser generation means and starting to move the irradiation means in the developing direction of the spring, wherein the control means controls the irradiation means at a speed substantially the same as a developing speed of a pitch of the spring by one pitch.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiment of the invention and, together with the description, serve to explain the principles of the invention.

DETAILED DESCRIPTION OF THE PREFERRED EMBODIMENT

Preferred embodiment of the present invention will be described in detail in accordance with the accompanying drawings.

First, the principle of spring manufacture will be described below.

There are two means available for providing a spring with pitch while it is being manufactured. One of the means is to forcibly insert a sharp member between the coils of rolled wire material (wedge method). The other is to push the rolled wire material out in a direction perpendicular to the plane in which the wire material is bent (pushing method). The following explanation of the embodiment will be made regarding the former, the wedge method.

Figure 1:
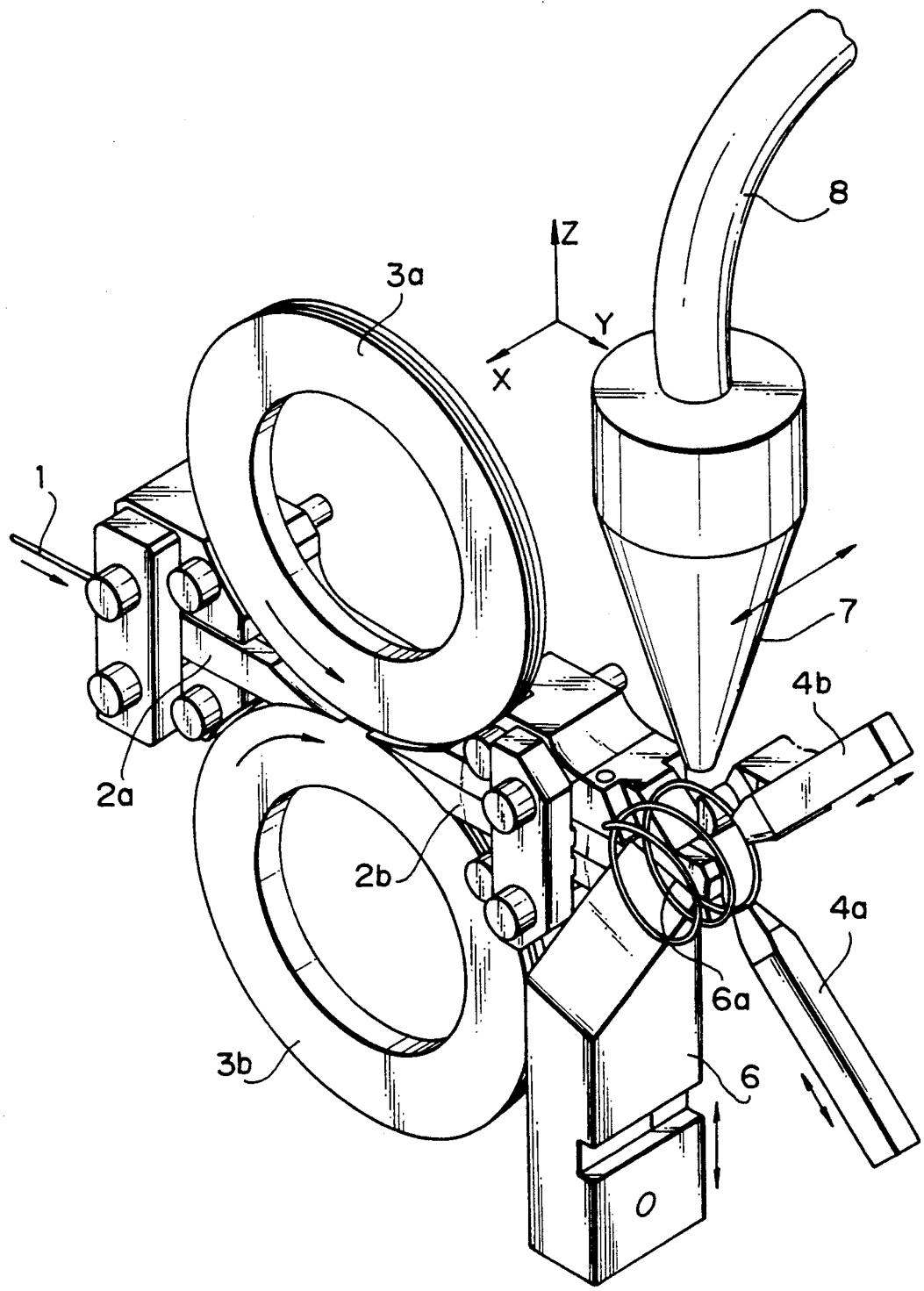
FIG. 1 is a perspective view for describing the structure and operation of a spring manufacturing section that relies upon the wedge method according to an embodiment of the present invention.

FIG. 1 shows the structure of the spring manufacturing section in the embodiment of the present invention.

In FIG. 1, wire material 1 supplied from a wire material supply source (not shown) is inserted into a guide groove (not shown) provided in wire-material guides 2a and 2b. Feed rollers 3a and 3b for clamping the wire material between them are provided at a position substantially midway between the wire-material guides 2a and 2b. These feed rollers 3a and 3b are rotated, by a wire material feed motor to be described later, in directions represented by arrows in FIG. 1, to feed the wire material 1 in a Y-direction. The wire material that has been conveyed out of the terminus of the wire-material guide 2b abuts against point tools 4a and 4b (using only one tool is possible) and is forcibly bent in a plane parallel to a Y-Z plane. At this time, the wire material 1 is provided with a diameter corresponding to the positions of the point tools 4a and 4b. Though there is no direct relation to the present invention, the point tools 4a and 4b are movable by a point-axis motor to be described later in directions represented by arrows in FIG. 1 while one spring is formed, and a spring having a desired external shape can be made by controlling the point-axis motor. For example, by moving these point tools 4a and 4b during manufacturing of one spring, a tapered spring can be manufactured. Further, in order that the wire material 1 bent by the point tools 4a and 4b will be bent in the Y-Z plane, the point tools are provided with grooves in the surfaces that contact the wire material 1.

As the feed rollers 3a and 3b continue rotating under the above conditions, a spring in which the mutually adjacent coils of the wire material are in intimate contact is formed. Wedge tool 6 is raised in the Z direction, and its blade portion 6a is thrust between a coil and the guide 2b as shown in FIG. 1. As a result, a spring which has a pitch wider than the diameter of the wire material can be manufactured.

At an initial stage for manufacturing a single spring, the wedge tool 6 is located at a position (home position) where the blade portion 6a is not in contact with the bent wire material. The wedge tool 6 is moved upward gradually (in the Z direction) during the spring manufacturing process, and at a final stage, it is moved downward (in −Z direction) to the home position. In other words, the wedge tool 6 is reciprocally moved along the Z-axis each time a single spring is manufactured. Thus-formed spring has end portions where the adjacent coils are in intimate contact (the pitch is approximately equal to the wire material thickness).

It should be noted that how far the wedge tool 6 is raised (this decides the pitch) and how long the wedge tool 6 is maintained at the raised position (this decides the free length of the spring) depend upon the length and pitch of the required spring to be manufactured.

When a single spring is formed by the above operations, the spring is cut out at the end of the wire material. In this embodiment, the cutting process doubles as a process for flattening the end surface of the spring.

In FIG. 1, reference numeral 7 denotes a laser output portion. Laser light from a laser generator (carbon dioxide gas laser unit) to be described later is introduced through optical fiber 8 connected to the laser output portion 7 and is focused (focal distance is several millimeters) by an internal lens of the laser output portion 7. The laser output portion 7 is movable in the X-axis direction, i.e., the same direction as the developing direction of the spring.

In this construction, when the cutting process is started, the feed rollers 3a and 3b are rotated at a predetermined speed and the laser generator is activated. Further, the laser output portion 7 is moved in the X direction in FIG. 1 (spring developing direction). In this embodiment, these motions are made to cut a formed spring in a plane parallel to the Y-Z plane.

The rotational speed of the feed rollers 3a and 3b (the wire material 1 supply speed) and control of the moving speed of the laser output portion 7 in the X-axis direction are determined in the following manner.

As described above, at both ends of a spring, the adjacent coils are in intimate contact with each other, that is, the spring pitch is in correspondence to the thickness of the wire material.

Accordingly, the laser output portion 7 moves in the X-axis direction at a constant speed only by the diameter of the spring while only one coil of the spring is formed. The laser output portion 7 can emit the laser beam during this motion.

The length of the wire material required to form one coil of the spring at the spring end portion (portion where the spring pitch becomes the wire material thickness) is decided based on the diameter of the formed spring and the wire material thickness. Assuming that the length for one coil at the spring end portion is "L" and the wire material thickness (diameter) is "W", moving speed "VL" of the laser output portion 7 and wire material feeding speed "VF" by the feed rollers 3a and 3b can be obtained by the following equations:

$$VL = W/t$$

$$VF = L/t \text{ (t: unit time period)}$$

In goes without saying that the velocities VL and VF are not independent of each other but correlated to each other (in synchronization with each other).

Moving speed of the laser output portion 7 cannot be raised over a certain point since the cutting speed by the laser beam depends upon the laser irradiation intensity, the material and the thickness of the object such as the wire material. This means that there is a limitation to the rotational speed of the feed rollers 3a and 3b during the wire material cutting by the laser.

In other words, the wire material feeding speed in the spring manufacturing (non-cutting process) is not necessarily the same as that in the cutting process. Accordingly, while a single spring is formed, the wire material is supplied at a high-speed, and when the wire material is cut, the wire material feeding speed is slowed. Specifically, in the cutting process, the wire material feeding speed is matched to the laser output portion 7 moving speed.

Figure 2:
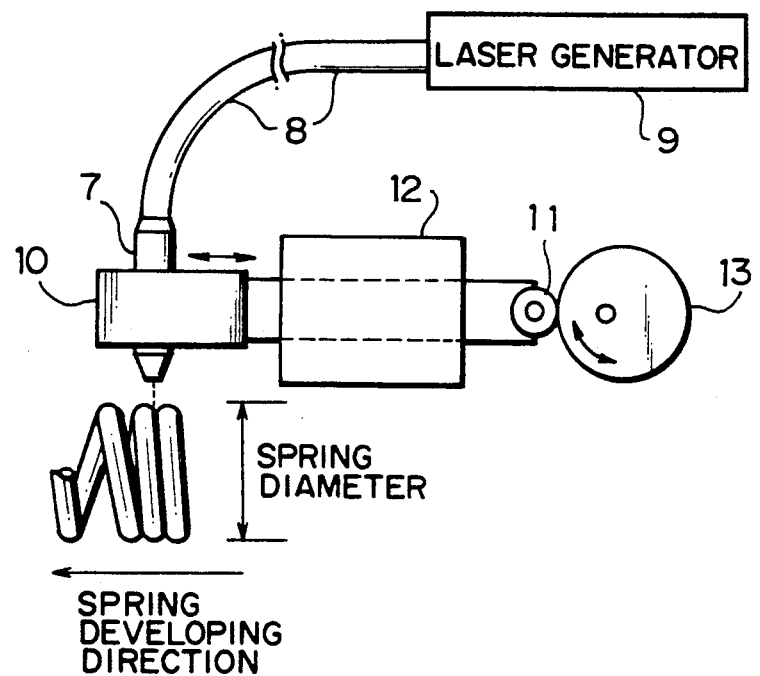
FIG. 2 illustrates the structure and operation of a laser cutting mechanism in the embodiment.

FIG. 2 shows the relation between the structure for moving the laser output portion 7 in the X direction and the laser light generator.

In FIG. 2, reference numeral 9 denotes the laser generator which generates laser light introduced to the laser output portion 7 through the optical fiber 8. In this construction, it is necessary that the optical fiber 8 has sufficient elasticity. ON/OFF control of the laser generator 9 is made by a CPU (to be described later) for controlling the overall apparatus.

Numeral 10 denotes a holder for holding the laser output portion 7. Cam follower 11 is rotatably attached to the end portion of the holder 10. The holder 10 slides back and forth along a direction represented by arrows (X-axis direction in FIG. 1) through slider 12.

As the holder 10 is drawn toward the right direction by a spring (not shown), the cam follower 11 at the end portion of the holder 10 abuts against the side surface of eccentric cam 13 with a predetermined force. Accordingly, by controlling a laser output portion moving motor to be described later for rotating the cam 13, the motion of the laser output portion 7 in the back-and-forth direction (X-axis direction in FIG. 1) and the laser output portion 7 moving speed can be controlled.

Figure 4:
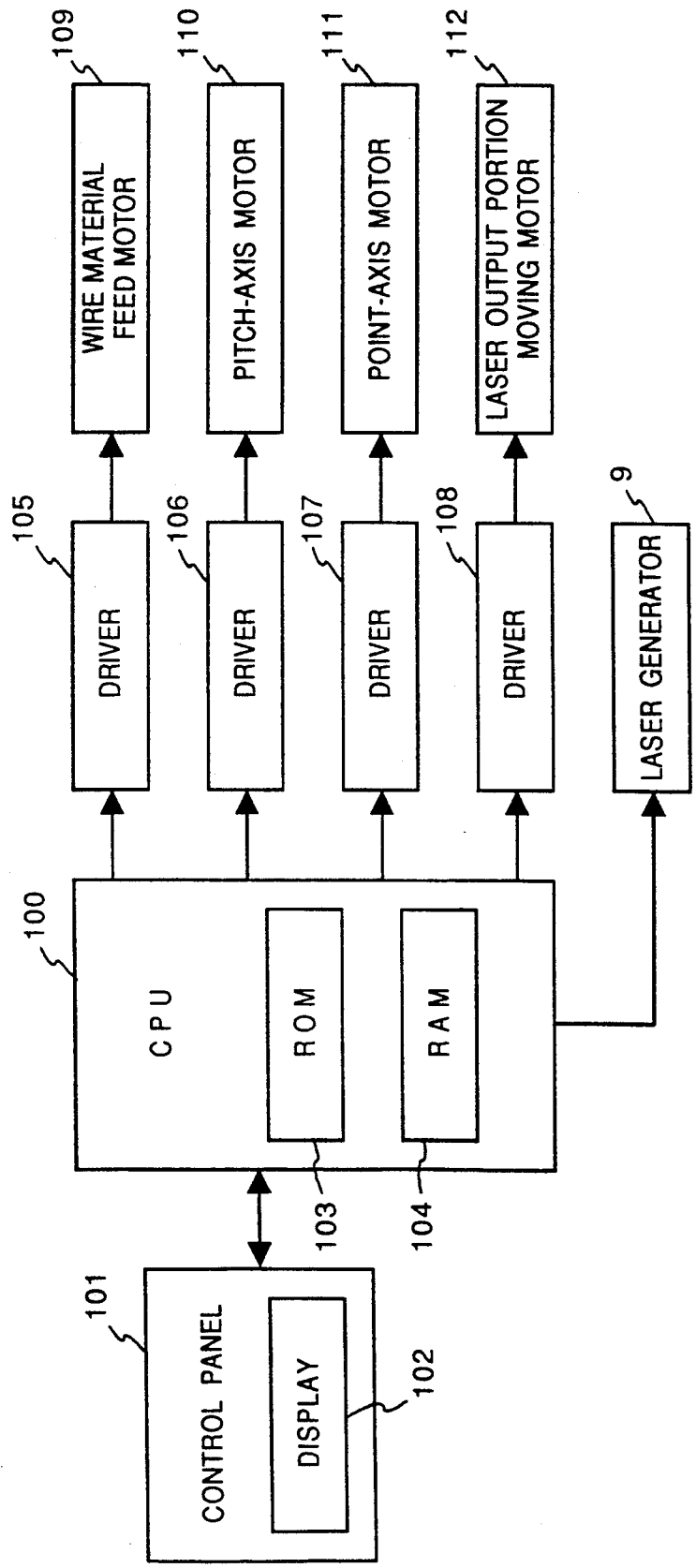
FIG. 4 is a block diagram showing the configuration of a spring manufacturing control system in the embodiment.

FIG. 4 is a block diagram showing the configuration of the control system of the spring manufacturing apparatus.

In FIG. 4, reference numeral 100 denotes a CPU; 101, a control panel for setting various parameters in spring manufacture and for instructing starting/termination of operations. The control panel 101 is provided with a display 102 for indicating the content of operation or status of the apparatus. The CPU 100 includes ROM 103 for storing the operation procedures and RAM 104 used as a work area. Numerals 105 to 108 denote divers of motors (servo motors); 109, a wire material feed motor as a rotational driving source of the feed rollers 3a and 3b; 110, a pitch-axis motor for the up-and-down motion of the wedge tool 6; 111, a point-axis motor for the motions of the point tools 4a and 4b; and 112, a laser output portion moving motor for the above-described motion of the laser output portion 7. As shown in FIG. 4, the laser generator 9 is also connected to the CPU 100 and is controlled by the CPU 100.

It should be noted that the structure for moving the wedge tool 6 and that for moving the point tools 4a and 4b approximately correspond to the structure as described above for moving the laser output portion 7.

Figure 5:
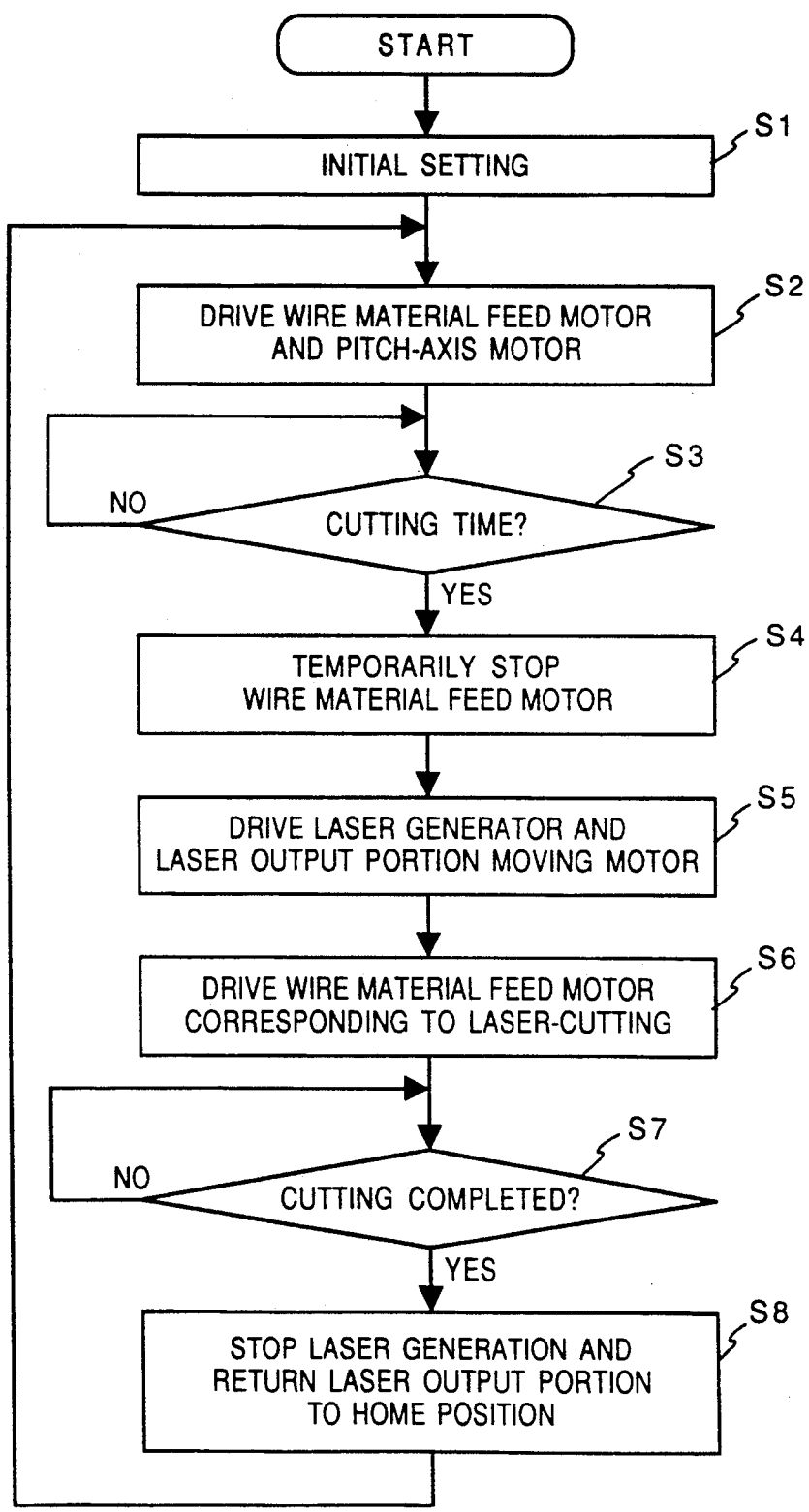
FIG. 5 is a flowchart showing the operations in the embodiment.

The spring manufacturing procedure according to the embodiment will be described with reference to a flowchart in FIG. 5. In order to simplify the explanation, a case where the point tools 4a and 4b are fixed, i.e., springs having a fixed diameter will be described.

First, various parameters such as the thickness (outer diameter) of wire material and the free length of spring are set as initial setting in step S1. Next, in step S2, the wire material feed motor 109, the pitch-axis motor 110 are driven based on the set parameters to perform bending of the wire material and pitch forming. In step S3, whether it becomes cutting time or not is determined. The determination is made in accordance with whether the predetermined wire material of the set spring free length has been fed or not. The wire material feed motor 109 and the pitch-axis motor 110 are operated until it is determined that it becomes the cutting time.

If YES in step S3, the process proceeds to step S4 in which the wire material feed motor 109 is temporarily stopped (at this time, the motion of the pitch-axis motor 110 has been completed). In steps S5 and S6, an instruction for generating a laser beam is outputted from the CPU 100 to the laser generator 9, at the same time, the laser output portion moving motor 112 is driven to move the laser output portion 7 at a predetermined speed in the X-axis direction in FIG. 1. Further, the wire material feeding speed by the wire material feed motor 109 is controlled based on the spring diameter, the wire material thickness, and the laser output portion 7 moving speed.

Next, in step S7, whether the cutting has been completed or not is determined. The determination is made in accordance with whether the wire material of the length corresponding to one coil of the spring has been fed or not.

If YES in step S7, the process proceeds to step S8 in which an instruction to stop the generation of the laser beam is outputted to the laser generator 9, and the laser output portion moving motor 112 is driven to return the laser output portion 7 to the home position (the initial position). The process returns to step S2 to repeat the above operations to continuously manufacture the springs.

According to the above process, at a point in time where the cutting has been completed, one coil of the next spring has already been formed. That is, the cutting and the forming of the next spring are performed in a parallel manner.

Compared with the conventional method in which the wire material having the length longer than that required for one spring should be supplied in consideration of the amount to be shaved at the end portion of the spring, the length of the wire material to be supplied is substantially corresponding to that required for manufacturing one spring. To be exact, there is the evaporation loss by the laser-spot diameter, however, the laser-cutting is performed in micron-order and the evaporation amount is negligible.

Further, in the above process, the wire material feed motor 109 is temporarily stopped. However, considering the process entirely, the motor 109 seems to be continuously driven, therefore, the spring forming and the cutting are performed as one sequence.

The above description has been made on the assumption that the spring pitch at the portion to be cut by the laser beam conforms to the wire material thickness, i.e., the adjacent coils are in intimate contact status. However, a case where pitch "P" of the cutting portion is twice wider than the wire material thickness "d" will be considered with reference to FIG. 3.

Figure 3:
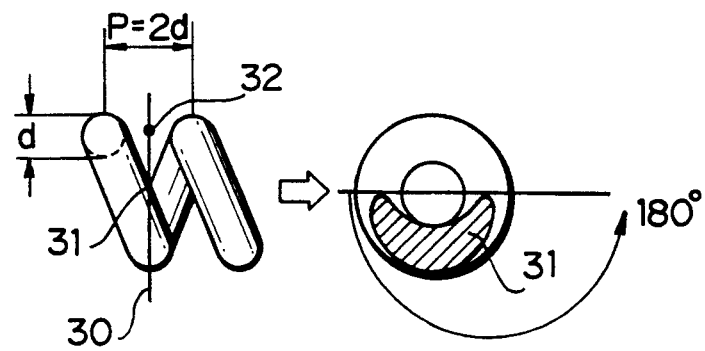
FIG. 3 illustrates the spring pitch at a cutting position and a cross-section of the spring.

If the spring is cut at point 30 in FIG. 3, the cross-section is a 180° area with respect to the center of the spring. In other words, the length of the wire material to be cut is ½ of that of the former case.

It seems possible to make the wire material feeding speed ½ and the laser output portion moving speed ½ of those in the former case, however, the cutting can be performed only if the cutting starting position is at point 31 in FIG. 3 when the laser output portion 7 starts emission of the laser beam, and a case where the cutting starting position is at point 32 should be considered. Accordingly, the laser beam is outputted for a 360° (the laser is not irradiated upon the wire material for 180° area) rotation of the spring. Even if the pitch P will be double of the wire material thickness d, the laser output portion 7 moving distance is P=2d and the wire material feeding amount is for one coil.

The laser output portion 7 moving distance depends upon the pitch P of a cutting position. The CPU 100 continues the laser emission while the laser output portion 7 is moved, and feeds the wire material for one coil by the feed rollers 3a and 3b, thus the control becomes very simple.

It should be noted that the 180° cross-section as shown in FIG. 3 is actually unstable as the end portion of a compression spring, and a cross-section having at least a 270° area is desirable. As the material thickness is usually several millimeters, the laser output portion 7 moving distance can be at the longest several millimeters.

In addition, it can be easily considered that the pitch at the spring end portion can be wider than the wire material thickness only by maintaining the status where the wedge tool 6 is held at a position substantially midway between the coils.

In this embodiment, the spring is provided with pitch in the wedge method, however, the present invention can be applied to the pushing method. Next, therefore, an example using the pushing method will be described below.

Figure 6:
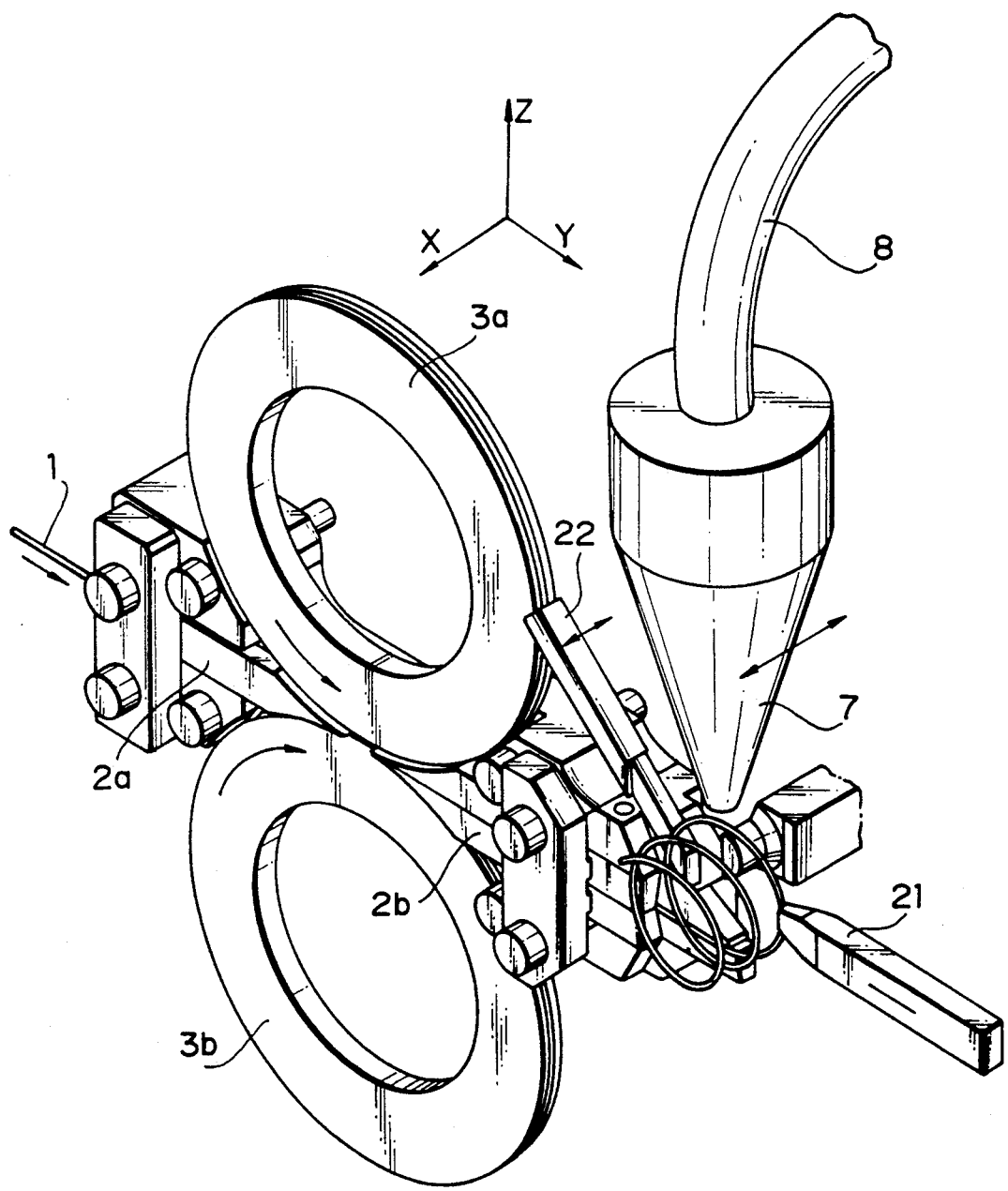
FIG. 6 illustrates the structure and operation of a spring manufacturing section that relies upon the pushing method according to the embodiment.
Figure 7:
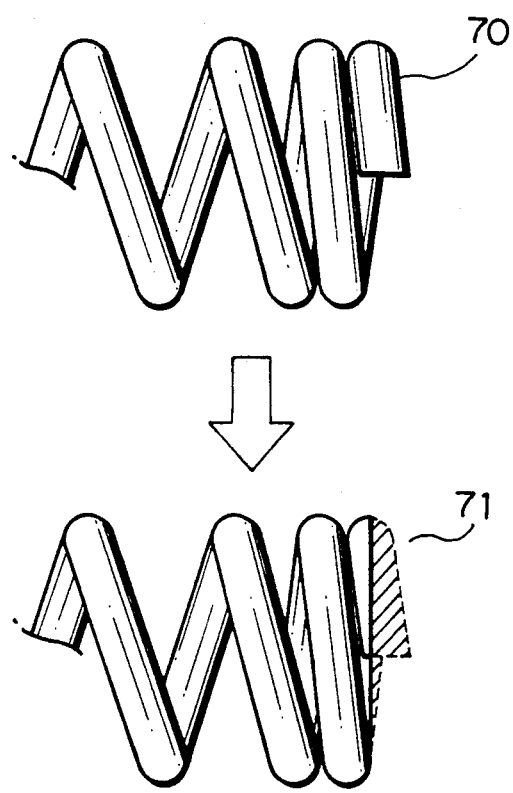
FIG. 7 illustrates a spring end portion and the end surface reforming in a conventional spring manufacturing apparatus.

FIG. 6 shows the principal components used in the spring manufacture by the pushing method. In FIG. 6, pushing tool 22 is provided in place of the wedge tool 6 in FIG. 1. As point tool 21 as shown in FIG. 6, only one point tool need to be employed to provide the wire material 1 with a diameter. However, the number of the point tools can be the same as that in FIG. 1.

In FIG. 6, the operations from a point where the wire material 1 is supplied to a point where it is forcibly bent by the point tool 21 correspond to those in the wedge method. Difference is that the pushing tool 22 is moved in the direction represented by arrows to push the wire material immediately after the wire material 1 has been bent in the X direction and the pitch has been formed.

The structure for moving the pushing tool 2 substantially corresponds to the laser output portion 7 moving structure as shown in FIG. 2, and therefore the explanation of the structure will be omitted. The pushing tool 2 is moved reciprocally along with the X-axis each time a single spring is formed.

Accordingly, the point-axis motor 111 in FIG. 4 can be used as a motor for moving the pushing tool 2 along the X-axis direction in this apparatus configuration. In other words, there is no difference from the configuration in the wedge method.

As described above, according to the embodiment, when manufacturing of a spring of a designated length is completed, the moving of the laser output portion 7 and the laser irradiation are started while the wire material is continuously fed. In this manner, the end surface of the spring can be cut flat. Further, as the cutting and the manufacturing of the next spring overlap with each other in a series of spring manufacturing, in comparison with the conventional spring manufacturing in which these processes are separately performed, the spring manufacture according to the embodiment can be performed at a high-speed.

In the embodiment, the wire material feeding speed is controlled in accordance with the cutting speed. However, if the cutting capability of the laser is satisfactory, the laser output portion moving speed can be controlled in accordance with the wire material feeding speed. Further, in the embodiment, the wire material feeding speed and the laser output portion moving speed upon cutting are both constant, however, these speeds are not necessarily made constant. For example, the speeds can be changed during the cutting only if the wire material feeding speed and the laser output portion moving speed are in synchronization with each other.

As described above, according to the present invention, the time period from the beginning to the completion of the spring having a flattened end surface is completed, can be reduced and many springs can be manufactured at a high-speed.

The present invention is not limited to the above embodiments and various changes and modifications can be made within the spirit and scope of the present invention. Therefore, to apprise the public of the scope of the present invention, the following claims are made.

What is claimed is:

1. A spring manufacturing apparatus which forms a spring by supplying a wire material toward a point tool provided around a spring forming section and bringing the wire material into contact with the point tool so as to forcibly bend the wire material to make a diameter of the spring, comprising:
   a feed roller for feeding the wire material toward the point tool;
   a first motor for rotating said feed roller;
   laser generation means for generating a laser beam for cutting the wire material;
   laser irradiation means, movable in a direction substantially parallel to a developing direction of the spring made of the wire material bent by being brought into contact with the point tool, for irradiating the laser beam generated by said laser generation means upon the bent wire material;
   a second motor for moving said laser irradiation means; and
   control means for, when manufacturing of a single spring is completed, activating said laser generation means and driving said first and second motors at a synchronous timing,
   wherein said spring manufacturing apparatus cuts the wire material by laser beam generated by said laser generation means in a plane substantially horizontal with respect to the developing direction of the spring.

2. The apparatus according to claim 1, wherein said control means controls said first motor based on the diameter of the spring, a thickness of the wire material and pitch of the spring at a cutting position so as to said feed roller feeds the wire material by a length required for forming one coil, and controls said second motor so as to move said laser irradiation means by one pitch.

3. A spring manufacturing apparatus which forms a spring by supplying a wire material toward a point tool located around a spring forming section and bringing the wire material into contact with the point tool so as to forcibly bend the wire material to make a diameter of the spring, comprising:
   wire material supply means for supplying the wire material toward the point tool;
   laser generation means for generating a laser beam for cutting the wire material;
   laser irradiation means, movable in a direction substantially parallel to a developing direction of the spring made of the wire material bent by being brought into contact with the point tool, for irradiating the laser beam generated by said laser generation means upon the bent wire material; and control means for, when manufacturing of a single spring is completed, activating said laser generation means and starting to move said laser irradiation means in the developing direction of the spring for one pitch.

4. A spring cutting mechanism in a spring manufacturing apparatus comprising:

laser generation means for generating a laser beam for cutting a wire material;

irradiation means, movable in a direction substantially parallel to a developing direction of a spring, for irradiating the laser beam generated by said laser generation means upon the wire material being formed into a spring; and control means for, when manufacturing of a single spring is completed and a next spring is to be manufactured, activating said laser generation means and starting to move said irradiation means in the developing direction of the spring, wherein said control means controls said irradiation means at a speed substantially same as a developing speed of a pitch of the spring for one pitch.

* * * * *